United States Patent [19]

Deubzer et al.

[11] 4,322,517

[45] Mar. 30, 1982

[54] HYDROPHILIC, CROSSLINKED, MODIFIED ORGANOPOLYSILOXANES AND PROCESS FOR PREPARING THE SAME

[75] Inventors: Bernward Deubzer, Burghausen; Jürgen Burkhardt, Winhoring, both of Fed. Rep. of Germany; Erich Brünner, Gmunden, Austria; Konrad Sallersbeck, Burghausen, Fed. Rep. of Germany

[73] Assignee: Wacker-Chemie GmbH, Munich, Fed. Rep. of Germany

[21] Appl. No.: 141,874

[22] Filed: Jan. 17, 1980

[30] Foreign Application Priority Data

May 2, 1979 [DE] Fed. Rep. of Germany ....... 2917754

[51] Int. Cl.$^3$ .............................................. C08G 77/06
[52] U.S. Cl. ..................,......................... 528/14; 264/2.2; 264/2.6; 351/160 H; 525/479; 526/279; 528/15; 528/16; 528/17; 528/20; 528/21; 528/23; 528/24; 528/26; 528/31; 528/32
[58] Field of Search ...................... 528/24, 26, 14, 15, 528/16, 17, 20, 21, 23, 31, 32; 264/2.2, 2.6; 351/160 H; 525/479; 526/279

[56] References Cited

U.S. PATENT DOCUMENTS

| 3,577,264 | 5/1971 | Nordstrom | 528/26 |
| 3,650,812 | 3/1972 | Nordstrom | 525/479 |
| 3,668,272 | 6/1972 | Sekmakas | 525/479 |
| 4,153,641 | 5/1979 | Deichert et al. | 528/24 |

OTHER PUBLICATIONS

"Molding Contact Lenses", *Precision-Cosmet Digest*, Sep., 1960, vol. 1, No. 2, pp. 1 to 6.

*Primary Examiner*—Melvyn I. Marquis

[57] ABSTRACT

Hydrophilic, crosslinked organopolysiloxanes are obtained from the polymerization of hydroxyalkylmethacrylate and/or hydroxalkylacrylate in the presence of an organopolysiloxane containing at least 40 mol percent of monoorganosiloxane units.

These hydrophilic, crosslinked, modified organopolysiloxanes are prepared by polymerizing hydroxyalkylmethacrylate and/or hydroxyalkylacrylate in the presence of free radical initiators and an organopolysiloxane containing at least 40 mol percent of monoorganosiloxane units which can be crosslinked or has been crosslinked by the condensation reaction in the presence of a condensation catalyst, the amount and type of condensation catalyst and/or catalytic system, including the inhibitor for the polymerization of the hydroxyalkylmethacrylate and/or hydroxyalkylacrylate, is selected so that the crosslinking of the organopolysiloxane which is substantially uniformly distributed in the hydroxyalkylmethacrylate and/or hydroxyalkylacrylate is initiated and preferably completed before the polymerization of the hydroxyalkylmethacrylate and/or hydroxyalkylacrylate is completed.

16 Claims, No Drawings

HYDROPHILIC, CROSSLINKED, MODIFIED ORGANOPOLYSILOXANES AND PROCESS FOR PREPARING THE SAME

The present invention relates to modified organopolysiloxanes, particularly to hydrophilic crosslinked modified organopolysiloxanes and more particularly to a process for preparing hydrophilic crosslinked modified organopolysiloxanes which comprises polymerizing hydroxyalkylmethacrylate and/or hydroxyalkylacrylate in the presence of free radical initiators and an organopolysiloxane containing at least 40 mol percent of monoorganosiloxane units.

BACKGROUND OF THE INVENTION

Hydrophilic crosslinked modified organopolysiloxanes and contact lenses made therefrom are described in U.S. Pat. No. 4,153,641, issued May 8, 1979 to Bausch and Lomb, Incorporated. The hydrophilic crosslinked organopolysiloxanes described therein are obtained from the polymerization of a hydroxyalkylmethacrylate, i.e., 2-hydroxypropylmethacrylate, in the presence of a modified organopolysiloxane. These known modified organopolysiloxanes are diorganopolysiloxanes and the so-called IPN systems.

Also, U.S. patent application Ser. No. 895,535, filed Apr. 13, 1978 now U.S. Pat. No. 4,198,165 describes a process for the preparation of crosslinked, modified organopolysiloxanes by polymerizing at least one monomer having at least one aliphatic multiple bond, in the presence of free radical initiators and a crosslinkable or crosslinked organopolysiloxane containing at least 40 mol percent of monoorganosiloxane units. However, the aforementioned U.S. application does not disclose using hydroxyalkylmethacrylates or hydroxyalkylacrylates.

Compared to the modified organopolysiloxanes known heretofore, the modified organopolysiloxanes of this invention have the advantages that they can be prepared from organopolysiloxanes which are readily available. Moreover, the modified organopolysiloxanes of this invention are more rigid; thus contact lenses made therefrom or containing such modified organopolysiloxanes enhance the correction of visual deficiencies which are attributable to a deformation of the cornea, for example astigmatism.

Therefore, it is an object of this invention to provide hydrophilic modified organopolysiloxanes. Another object of this invention is to provide crosslinked hydrophilic modified organopolysiloxanes. Still another object of this invention is to provide crosslinked modified organopolysiloxanes which are rigid and may be used to make contact lenses. A further object of this invention is to provide a process for preparing crosslinked hydrophilic modified organopolysiloxanes.

SUMMARY OF THE INVENTION

The foregoing objects and others which will become apparent from the following description are accomplished in accordance with this invention, generally speaking, by providing crosslinked hydrophilic organopolysiloxanes which are modified by polymerizing at least one polymerizable monomer selected from the group consisting of hydroxyalkylmethacrylate and hydroxyalkylacrylate in the presence of an organopolysiloxane containing at least 40 mol percent of monoorganosiloxane units.

DETAILED DESCRIPTION OF THE INVENTION

The hydroxyalkylmethacrylates or hydroxyalkylacrylates used in the preparation of the modified organopolysiloxanes of this invention may be represented by the general formula:

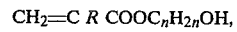

$$CH_2=C\,R\,COOC_nH_{2n}OH,$$

wherein R is hydrogen or methyl, and n is 2 or 3. Examples of suitable acrylates and methacrylates are 2-hydroxyethylmethacrylate, 2-hydroxypropylmethacrylate, 3-hydroxypropylmethacrylate, 2-hydroxyethylacrylate, 2-hydroxypropylacrylate and 3-hydroxypropylacrylate. The preferred hydroxyalkylacrylates are 2-hydroxyethylmethacrylate and 2-hydroxypropylmethacrylate.

If desired, mixtures of various hydroxyalkylmethacrylates and/or hydroxyalkylacrylates may be employed. In addition to hydroxyalkylmethacrylate and/or hydroxyalkylacrylate it is possible to use at least one additional monomer which also has an olefinic double bond and which can be polymerized by means of free radicals. Examples of such other monomers having an olefinic double bond are acrylic acid, acrylic acid salts, methacrylic acid, methacrylic acid salts, acrylic acid esters which are free of hydroxyl groups or methacrylic acid esters, as well as ethylacrylate, n-butylacrylates, methylmethacrylate, n-butylmethacrylate and allylmethacrylate, N-vinyl-pyrrolidone, styrene and glycidyl methacrylate. Also it is possible to use at least one monomer having two or more olefinic double bonds, such as divinylbenzene or ethylene glycol dimethacrylate. So-called IPN systems can be obtained when at least one monomer having more than one olefinic double bond is also used. The use of monomers having more than one aliphatic double bond is however by no means essential and, surprisingly, it is possible to achieve excellent results in the absence of such monomers.

However, it is preferred that monomers which can be polymerized with free radicals, other than hydroxyalkylmethacrylates or hydroxyalkylacrylates be used and they should be used only in such quantities as are necessary to ensure that the organopolysiloxane which is to be modified is soluble in the mixture of monomers, at least at the temperature at which the monomers are polymerized. Preferably the amount of monomers employed should not exceed about 75 percent by weight, based on the total weight of the polymerizable monomers.

Also, it is preferred that the siloxane units of the organopolysiloxane used in the process of this invention consist of at least 50 mol percent and, more preferably, at least 90 mol percent of monoorganosiloxane units.

Moreover, it is preferred that siloxane units other than the monoorganosiloxane units in the organopolysiloxane be diorganosiloxane units, triorganosiloxane units and/or $SiO_{4/2}$-units. Furthermore, it is preferred that the triorganosiloxane units and the $SiO_{4/2}$-units not exceed more than about 5 mol percent.

The monoorganosiloxane units can be represented by the formula $R\,SiO_{3/2}$, the diorganosiloxane units can be represented by the formula $R_2SiO$. In all of these formulas R represents the same or different monovalent hydrocarbon radicals or substituted monovalent hydrocarbon radicals which preferably contain from 1 to 18 carbon atoms per radical.

Examples of hydrocarbon radicals represented by R are straight-chain or branched chain alkyl radicals, such as methyl, ethyl, n-propyl, isopropyl, n-butyl and sec-butyl radicals; as well as octyl, dodecyl, and octadecyl radicals; cycloalkyl radicals such as the cyclopentyl and cyclohexyl radicals; alkenyl radicals such as the vinyl and allyl radicals; aryl radicals such as the phenyl radical; alkaryl radicals such as the tolyl radicals; and aralkyl radicals such as the benzyl radical.

Examples of substituted hydrocarbon radicals represented by R are halogenated hydrocarbon radicals such as the 3,3,3-trifluoropropyl radical and the alpha, alpha, alpha-trifluorotolyl radical, as well as chlorophenyl and dichlorophenyl radicals. Since they are readily available, it is preferred that at least 90 percent of the number of SiC-bonded organic radicals in the organosiloxane portion of the modified organopolysiloxanes and/or the organopolysiloxanes used in the process of this invention be methyl radicals.

It is preferred that the organopolysiloxane portion of the modified organopolysiloxanes used be from about 20 to 90 percent by weight and more preferably from 40 to 80 percent by weight, based on the total weight of the modified organopolysiloxanes used.

It is preferred that the average molecular weight of the organopolysiloxane or of the organopolysiloxane used in the preparation of the modified organopolysiloxanes be at least 1000, while the maximum molecular weight must not exceed that at which the organopolysiloxanes used in the preparation of the modified organopolysiloxane is soluble at room temperature or at an elevated temperature in the hydroxyalkylmethacrylate and/or hydroxyalkylacrylate and such other monomers as may be used.

The modified organopolysiloxanes employed in this invention can be prepared from the polymerization of at least one hydroxyalkylmethacrylate and/or hydroxyalkylacrylate and additional monomers, if present, by means of free radical initiators in the presence of at least one organopolysiloxane containing at least 40 mol percent of monoorganosiloxane units which has been crosslinked or can be crosslinked by condensation or the addition of Si-bonded hydrogen to Si-bonded alkenyl groups. The organopolysiloxane is homogeneously distributed throughout the hydroxyalkylmethacrylate and/or hydroxyalkylacrylate and such other monomers as may be employed and the hydroxyalkylmethacrylate or hydroxyalkylacrylate and additional monomers, if present, are polymerized in the presence of a condensation catalyst for the organopolysiloxane, or a catalyst which promotes the addition of Si-bonded hydrogen to Si-bonded alkenyl groups, and when a catalyst is used which promotes the addition of Si-bonded hydrogen to Si-bonded alkenyl groups, then at least one organosilicon compound having at least 2 Si-bonded hydrogen atoms per molecule must be present.

When organopolysiloxanes which have been crosslinked by condensation are used in the preparation of the modified organopolysiloxanes, it is preferred that all condensable groups contained therein be Si-bonded hydroxyl groups and/or alkoxy groups having from 1 to 8 carbon atoms. Examples of suitable alkoxy groups are methoxy, ethoxy, propoxy, isopropoxy, butoxy, hexoxy and octoxy groups. It is however, preferred that the alkoxy groups contain from 1 to 4 carbon atoms.

When the modified organopolysiloxanes used in the preparation of the organopolysiloxanes of this invention are to be crosslinked by the condensation reaction, then they must contain a total of at least 0.01 percent by weight of Si-bonded hydroxyl groups and/or alkoxy groups. However, it is preferred that they contain up to a maximum of 5 percent by weight of Si-bonded hydroxyl groups and/or alkoxy groups.

When the organopolysiloxanes used in the preparation of the modified organopolysiloxanes of this invention can be crosslinked by the addition of Si-bonded hydrogen to Si-bonded alkenyl groups, then at least 0.1 percent by weight and preferably from 1 to 25 percent of the number of SiC-bonded radicals in the organopolysiloxane must be alkenyl radicals and more preferably vinyl radicals.

The free radicals used in the polymerization of hydroxyalkylmethacrylate and/or hydroxyalkylacrylate and possibly other monomers in the presence of the organopolysiloxanes are preferably obtained from organic peroxide compounds. However, other free radical initiators may be used. Examples of other radical initiators are azo compounds in which the two nitrogen atoms of the azo group are bonded to tertiary carbon atoms and the remaining valences of the tertiary carbon atoms are saturated by nitrile, carboxyl, cycloalkylene or alkyl radicals, enolizable alpha-phenylcarbonyl compounds, sulfinic acids and compounds rich in energy such as alpha, beta or gamma radiation or ultraviolet radiation. The formation of free radicals can also be achieved by thermal means.

Examples of suitable compounds which may be used to form free radicals are diacylperoxides, such as benzoyl peroxide and lauroyl peroxide; ketoperoxides such as acetone peroxide and cyclohexanone peroxide; hydrocarbon peroxides, such as tert-butyl hydroperoxide, cumene hydroperoxide and decahydronaphthalene hydroperoxide; di-hydrocarbon peroxides such as di-tert-butyl peroxide and dicumyl peroxide; perketales such as 1,1-di-tert-butylperoxy-3,3,5-trimethylcyclohexane; peresters such as tert-butyl perbenzoate, tert-butylperoxy isopropyl percarbonate, tert-butyl perpivalate, tert-butyl peroctoate, tert-butylcyclohexyl percarbonate, tert-butyl permaleinate and acetylcyclohexane sulfonyl peroxide.

Also mixtures of various peroxides may be used to generate free radicals.

It is preferred that the chemical agents used for generating free radicals be present in an amount of from 0.0005 to 5 percent by weight and, more preferably from 0.003 to 2 percent by weight, based on the total weight of the polymerizable monomer and the organopolysiloxane.

The hydroxyalkylmethacrylate and/or hydroxyalkylacrylate and additional monomer if present, used in the preparation of the modified organopolysiloxanes of this invention, are preferable used in amounts of from 20 to 60 percent by weight, based on the total weight of the hydroxyalkylmethacrylate, the hydroxyalkylacrylate and additional monomer if present, and the organopolysiloxane.

The temperature and pressure used in the polymerization of the hydroxyalkylmethacrylate and/or hydroxyalkylacrylate and additional monomer, if present, may be the same temperature and pressure which have or could have been used in the processes known heretofore for the polymerization of monomers having an aliphatic multiple bond in the presence of organopolysiloxanes and free radical initiators, regardless of whether or not the organopolysiloxanes contain monoorganosiloxane units. Generally, temperatures of from 50° to 220° C. and pressures of from 0.1 to 20 bar (abs.) are preferred.

When the organopolysiloxanes used in the preparation of the modified organopolysiloxanes of this invention are of a type which can be crosslinked by the condensation reaction, then the polymerization of the hydroxyalkylmethacrylate and/or hydroxyalkylacrylate and additional monomer if present, must take place in the presence of the organopolysiloxane and a condensation catalyst for the organopolysiloxane. Thus, any catalyst which could have been used heretofore for promoting the condensation of condensable organosiloxanes having at least 40 mol percent of monoorganosiloxane units may be used in the process of this invention. Examples of preferred condensation catalysts are organic compounds such as acylates, alcoholates and chelates, especially acetylacetonates, of elements relating to the second, third and/or fourth principal group of the Periodic Table according to Mendeleeff and the transition elements of the first to the eighth sub-group of the Periodic Table according to Mendeleeff, as well as lanthanides. Other examples of suitable catalysts are acylates, alcoholates, and chelates of Pb, Al, Zn, Co, Ti and Sn. Examples of such preferred condensation catalysts are lead-2-ethylhexoate, lead naphthenate, zinc naphthenate, zinc-2-ethylhexoate, tin-2-ethylhexoate, dibutyltin diacetate, dibutyltin dilaurate, cobalt-2-ethylhexoate, cobalt naphthenate, aluminum naphthenate, aluminum triacetylacetonate, aluminum isopropylate, aluminum-tri-sec-butylate and polymeric butyl titanate, as well as ferric naphthenate, calcium naphthenate, cerium naphthenate and Ce-2-ethylhexoate. Additional examples of condensation catalysts for the organopolysiloxanes are inorganic lead compounds such as lead carbonate, basic lead carbonate, i.e., a compound of the formula $Pb_3(OH)_2(CO_3)_2$, lead monoxide and lead dioxide as well as quaternary ammonium compounds such as tetramethylammonium acetate and tetramethylammonium hydroxide.

When the organopolysiloxanes prepared in accordance with this invention are to be used for purposes for which they must be optically transparent, then only condensation catalysts which are not detrimental to the optical properties are used. Likewise, when the modified organopolysiloxanes are to be used for purposes which require that they be suitable from a physiological point of view, then it is essential that a condensation catalyst be selected which will not be physiologically objectionable and which will be tolerated for example by the human eye. Examples of condensation catalysts which are physiologically acceptable are acylates, alcoholates and/or chelates of aluminum.

Mixtures of various condensation catalysts may likewise be employed. It is preferred that the condensation catalysts be used in an amount of from 0.001 to 3 percent by weight, based on the total weight of the polymerizable monomer and the organopolysiloxane.

When the organopolysiloxanes used in the preparation of the modified organopolysiloxanes of this invention are of the type which can be crosslinked by the addition of Si-bonded hydrogen to Si-bonded alkenyl groups, then the polymerization of the hydroxyalkylmethacrylate and/or hydroxymethylacrylate and an additional monomer if present, must take place in the presence of the organopolysiloxane and a catalyst which promotes the addition of Si-bonded hydrogen to Si-bonded alkenyl groups and at least one organosilicon compound having at least two Si-bonded hydrogen atoms per molecule. Any catalyst which has or could have been used heretofore to promote the addition of Si-bonded hydrogen to Si-bonded alkenyl groups, may be used in this process to promote the addition of Si-bonded hydrogen to Si-bonded alkenyl groups. Examples of such addition catalysts are metallic and finely dispersed platinum, ruthenium, rhodium, palladium and iridium. These metals may be placed on such carriers as silicon dioxide, aluminum oxide or activated carbon. Other compounds or complexes of these elements may also be used, such as $PtCl_4$, $H_2PtCl_6.6H_2O$, $Na_2PtCl_4.H_2O$, platinum-olefin complexes, platinum-alcohol complexes, platinum-alcoholate complexes, platinum-ether complexes, platinum-aldehyde complexes, platinum-ketone complexes and platinum-vinylsiloxane complexes; especially platinum-divinyltetramethyldisiloxane complexes which are free of or contain a detectable amount of halogen; as well as iron, nickel and cobalt carbonyls.

The choice of catalysts to promote the addition of Si-bonded hydrogen to Si-bonded alkenyl groups may be limited by the intended application of the resultant modified organopolysiloxanes.

If the noble metals, platinum compounds, and/or platinum complexes described above are used as catalysts for the addition of Si-bonded hydrogen to Si-bonded alkenyl groups, then these catalysts are preferably used in amounts of from 0.5 to 500 ppm by weight and more preferably from 2 to 400 ppm by weight, calculated as the elemental metal and based on the total weight of the polymerizable monomer and the organopolysiloxane.

In the preparation of the modified organopolysiloxanes of this invention, it is possible to use the organosilicon compounds containing at least 2 Si-bonded hydrogen atoms per molecule which have been or could have been used heretofore in crosslinking organopolysiloxanes by the addition of Si-bonded hydrogen, irregardless of whether or not the organopolysiloxane contains monoorganosiloxane units. The organosilicon compounds having at least 2 Si-bonded hydrogen atoms per molecule are preferably organopolysiloxanes having Si-bonded hydrogen atoms in which the silicon valences which are not saturated by hydrogen atoms and siloxane-hydrogen atoms are saturated by methyl radicals, ethyl and/or phenyl radicals.

The organosilicon compounds containing at least 2 Si-bonded hydrogen atoms per molecule are preferably used in amounts from 0.1 to 15 Si-bonded hydrogen atoms per Si-bonded alkenyl group.

Depending on the activity and the amount of condensation catalyst or catalyst which promotes the addition of Si-bonded hydrogen to Si-bonded alkenyl groups, the crosslinking of the organopolysiloxane takes place at temperatures between room temperature and 220° C. and over varying periods of time. Consequently, by selecting the type and quantity of condensation catalyst or catalyst which promotes the addition of Si-bonded hydrogen to Si-bonded alkenyl groups, it is possible to crosslink the organopolysiloxane which is substantially uniformly dispersed in hydroxyalkylmethacrylate and/or hydroxyalkylacrylate and other monomers, if present, prior to the polymerization and/or simultaneously with the polymerization and/or subsequent to the polymerization of the hydroxyalkylmethacrylate and/or hydroxyalkylacrylate and other monomer, if present. Since this will result in the preparation of transparent products, it is preferred that the type and quantity of condensation catalyst or catalyst which promotes the addition of Si-bonded hydrogen to Si-bonded alkenyl groups and/or the catalytic system, including an inhibitor for the polymerization of hydroxyalkylmethacrylate and/or hydroxyalkylacrylate and other monomers, if present, be selected so that crosslinking of the organopolysiloxane which is uniformly dispersed in the hydroxyalkylmethacrylate and/or hydroxyalkylacrylate and other monomer, if present, will take place prior to the polymerization of the hydroxyalkylmethacrylate and/or hydroxyalkylacrylate and other monomers, if present, or at least before the polymerization process is completed.

It is preferred that the organopolysiloxane used in the process of this invention be capable of being crosslinked by the condensation reaction.

This invention also relates to a process for preparing hydrophilic, crosslinked modified organopolysiloxanes which comprises polymerizing hydroxyalkylmethacrylate and/or hydroxyalkylacrylate and other monomers, if desired, in the presence of free radicals and an organopolysiloxane containing at least 40 mol percent of monoorganosiloxane units which can be, or has been crosslinked by the condensation reaction in the presence of a condensation catalyst, with the type and quantity of the condensation catalyst and/or catalytic system, including the inhibitor for the polymerization of the hydroxyalkylmethacrylate and/or hydroxyalkylacrylate and the other monomers, if present, being selected so that the crosslinking of the organopolysiloxane containing the condensation catalyst which is substantially uniformly dispersed in the hydroxyalkylmethacrylate and/or hydroxyalkylacrylate and the other monomers, if present, occurs prior to the polymerization of the hydroxyalkylmethacrylate and/or hydroxyalkylacrylate and other monomers, if present or at least before the polymerization is complete.

In addition to the organopolysiloxane containing at least 40 mol percent of monoorganosiloxane units, the crosslinking agent for the organopolysiloxane and the hydroxyalkylmethacrylate and/or hydroxyalkylacrylate and the other monomers, or polymers of such a monomer, the modified organopolysiloxanes of this invention may contain other substances which have or could have been used heretofore in the preparation of polymers from at least one monomer having at least one aliphatic multiple bond by means of free radicals and/or during the preparation of compositions of organopolysiloxanes capable of being crosslinked. Examples of such substances are pigments of soluble dyes which impart to the finished products a desired color; fillers such as pyrogenically produced silicon dioxide, titanium dioxide and/or glass fibers; stabilizers, accelerators such as cobalt-2-ethylhexoate; promoters and inhibitors such as hydroquinone monomethylether.

Although the modified organopolysiloxanes prepared in accordance with this invention are hydrophilic, they are nevertheless insoluble in water. If desired, their surface can be made even more hydrophilic by treating the surface of the organopolysiloxane with acids or bases.

The modified organopolysiloxanes of this invention may be employed for all purposes for which hydrophilic, crosslinked, modified organopolysiloxanes obtained from the polymerization of hydroxyalkylmethacrylate in the presence of the organopolysiloxane have been or could have been used heretofore.

The modified organopolysiloxanes of this invention are preferably used to form contact lenses or as components of contact lenses, especially as body material for lens.

Likewise, the process of this invention is applicable for the preparation of contact lenses or as components for contact lenses.

The modified organopolysiloxanes of this invention can be molded or shaped by pouring, pressing, spray-pouring or spray-pressing and contact lenses may be made from the molded articles thus obtained. Also, the modified organopolysiloxanes may be prepared in contact with a convex molding surface which corresponds to the shape of the cornea of the human eye, thus making it possible to obtain a concave lens surface, while the convex lens surface is subsequently shaped by mechanical treatment, such as grinding.

Also the modified organopolysiloxanes of this invention may be used in the preparation of water-insoluble hydrophilic constituents of pharmaceutical compositions, including carriers containing an internal or external active ingredient, as well as for the preparation of perfume compositions, pesticide compositions and herbicide compositions.

In the following examples all parts are by weight unless otherwise specified.

EXAMPLE 1

About 65 parts of an organopolysiloxane containing 98 mol percent of $CH_3SiO_{3/2}$ units, 2 mol percent of $(CH_3)_2SiO$ units and having 2.6 percent by weight of Si-bonded hydroxyl groups with an average molecular weight of about 3,000 are dissolved in 35 parts of 2-hydroxyethylmethacrylate and thereafter 0.03 part of hydroquinone monomethylether, 1.0 part of aluminum triacetylacetonate and 0.1 part of dicumyl peroxide are added. The solution is placed in a compression mold and heated for 5 minutes to 200° C. under a pressure of 10 bar (abs.). An optically clear molded article is obtained which may be further modified by mechanical means to form an article having the desired configuration.

EXAMPLE 2

About 75 parts of the organopolysiloxane described in Example 1 are dissolved in a mixture containing 12 parts of n-butylmethacrylate, 12 parts of 2-hydroxyethyl methacrylate, 1 part of ethylene glycol dimethacrylate, 0.03 part of hydroquinone monomethylether, 1 part of aluminum-tri-sec-butylate and 0.1 part of dicumyl peroxide.

The solution is placed in test tubes (160 mm × 15 mm) and heated in an autoclave for 20 minutes to a temperature of 160° C. under a compressed air pressure of 10 bar (abs.). When the test tubes are fractured, optically clear molded articles are obtained which are suitable for processing by mechanical means to form an article having the desired configuration.

What is claimed is:

1. Hydrophilic crosslinked modified organopolysiloxanes which are obtained from the polymerization of at least one polymerizable monomer selected from the group consisting of hydroxyalkylmethacrylate and hydroxyalkylacrylate in the presence of an organopolysiloxane which is soluble in the polymerizable monomer and has a molecular weight of at least 1,000, in which the organic groups of the organopolysiloxane are selected from the group consisting of hydrocarbon radicals, halogenated hydrocarbon radicals and mixtures thereof, said organopolysiloxane is crosslinked by condensation or by the addition of Si-bonded hydrogen to Si-bonded alkenyl groups and at least 40 mol percent of the siloxane units of the organopolysiloxane are monoorganosiloxane units.

2. The hydrophilic organopolysiloxanes of claim 1, wherein the siloxane units of the organopolysiloxane contain at least 60 mol percent of monoorganosiloxane units.

3. The hydrophilic organopolysiloxanes of claim 1, wherein the siloxane units of the organopolysiloxane contain from 40 to 80 mol percent of monoorganosiloxane units.

4. The hydrophilic organopolysiloxanes of claim 1, wherein the polymerization is conducted in the presence of at least one acrylate and at least one other monomer having aliphatic unsaturation.

5. The hydrophilic organopolysiloxanes of claim 1, 2, 3 or 4, wherein the acrylate is hydroxyalkylmethacrylate.

6. The hydrophilic organopolysiloxanes of claim 1, 2, 3 or 4, wherein the organopolysiloxanes are treated with an agent selected from the group consisting of acids and bases to remove a portion of the organopolysiloxane from the surface.

7. A process for preparing hydrophilic crosslinked modified organopolysiloxanes which comprises polymerizing at least one polymerizable monomer selected from the group consisting of hydroxyalkylmethacrylate and hydroxyalkylacrylate in the presence of a free radical initiator and an organopolysiloxane which has been crosslinked by condensation or by the addition of Si-bonded hydrogen to Si-bonded alkenyl groups, in which the crosslinked organopolysiloxane is dispersed in the polymerizable monomer and at least 40 mol percent of the siloxane units of the crosslinked organopolysiloxane are monoorganosiloxane units, said organopolysiloxane prior to crosslinking is soluble in the polymerizable monomer and has a molecular weight of at least 1,000 and the organic groups of the organopolysiloxane are selected from the group consisting of hydrocarbon radicals, halogenated hydrocarbon radicals and mixtures thereof.

8. A process for preparing hydrophilic crosslinked modified organopolysiloxanes which comprises polymerizing at least one polymerizable monomer selected from the group consisting of hydroxyalkylmethacrylate and hydroxyalkylacrylate in the presence of a free radical initiator, a catalyst which promotes crosslinking and an organopolysiloxane which is soluble in the polymerizable monomer and has a molecular weight of at least 1,000, in which the organic groups of the organopolysiloxane are selected from the group consisting of hydrocarbon radicals, halogenated hydrocarbon radicals and mixtures thereof and at least 40 mol percent of the siloxane units are monoorganosiloxane units and is further capable of being crosslinked by condensation or by the addition of Si-bonded hydrogen to Si-bonded alkenyl groups, in which the crosslinking of the organopolysiloxane is initiated prior to the polymerization of the polymerizable monomer.

9. The process of claim 8, wherein the polymerization is conducted in the presence of a mixture of polymerizable monomers containing an acrylate and at least one other monomer having aliphatic unsaturation.

10. The process of claim 8, wherein the organopolysiloxane and catalyst which promotes crosslinking are dispersed in the polymerizable monomer.

11. The process of claim 8, wherein the organopolysiloxane contains condensable groups and the catalyst is a condensation catalyst.

12. The process of claim 8, wherein the organopolysiloxane contains alkenyl groups and the catalyst promotes the addition of Si-bonded hydrogen to the alkenyl groups and an organosilicon compound containing at least 2 Si-bonded hydrogen atoms per molecule is also present.

13. A transparent lens containing hydrophilic crosslinked organopolysiloxanes which are obtained from the polymerization of at least one polymerizable monomer selected from the group consisting of hydroxyalkylmethacrylate and hydroxyalkyl acrylate in the presence of an organopolysiloxane which is soluble in the polymerizable monomer and has a molecular weight of at least 1,000, in which the organic groups of the organopolysiloxane are selected from the group consisting of hydrocarbon radicals, halogenated hydrocarbon radicals and mixtures thereof, said organopolysiloxane is crosslinked by condensation or by the addition of Si-bonded hydrogen to Si-bonded alkenyl groups and at least 40 mol percent of the siloxane units of the organopolysiloxane are monoorganosiloxane units.

14. The transparent lens of claim 13, wherein the siloxane units of the organopolysiloxane contain at least 60 mol percent of monoorganosiloxane units.

15. The transparent lens of claim 13, wherein the siloxane units of the organopolysiloxane contain from 40 to 80 mol percent of monoorganosiloxane units.

16. A process for preparing the transparent lens of claim 13 to conform to the shape of the eye which comprises molding the hydrophilic crosslinked organopolysiloxanes on a convex mold surface which conforms to the shape of the cornea of the eye.

* * * * *

UNITED STATES PATENT AND TRADEMARK OFFICE
CERTIFICATE OF CORRECTION

PATENT NO. : 4,322,517

DATED : March 30, 1982

INVENTOR(S) : Bernward Deubzer, Jürgen Burkhardt, Erich Brünner and Konrad Sallersbeck It is certified that error appears in the above-identified patent and that said Letters Patent are hereby corrected as shown below:

In the Abstract:

Line 3, after "and/or", change "hydroxalkylacrylate" to read:

hydroxyalkylacrylate .

Column 1, line 27, after "Ser. No.", change 895,535 to read:

895,835 .

Column 1, line 28, after "U. S. Pat. No.", change 4,198,165 to read:

4,170,610

Signed and Sealed this

Twenty-fifth Day of January 1983

[SEAL]

Attest:

GERALD J. MOSSINGHOFF

Attesting Officer  Commissioner of Patents and Trademarks